O. A. GILMORE.

POTATO HARVESTING MACHINE.

APPLICATION FILED SEPT. 19, 1910.

988,871. Patented Apr. 4, 1911.

Witnesses
F. C. Caswell
K. H. Hansen

Inventor
Oscar A. Gilmore
by John E. Stryker atty.

THE NORRIS PETERS CO., WASHINGTON, D. C.

UNITED STATES PATENT OFFICE.

OSCAR A. GILMORE, OF ST. PAUL, MINNESOTA.

POTATO-HARVESTING MACHINE.

988,871. Specification of Letters Patent. Patented Apr. 4, 1911.

Application filed September 19, 1910. Serial No. 582,764.

*To all whom it may concern:*

Be it known that I, Oscar A. Gilmore, a citizen of the United States, residing at St. Paul, in the county of Ramsey and State of Minnesota, have invented new and useful Improvements in Potato-Harvesting Machines, of which the following is a specification.

My invention relates to improvements in potato harvesters.

The object of my invention is to provide a self contained harvester adapted to dig, gather and sack potatoes, and also to remove the earth therefrom.

A further object is to provide a potato harvester designed to sort and deliver different sizes of potatoes.

A further object is to provide a potato harvester having a plow and conveyer constructed so as to be free from severe strain, the conveyer being arranged to pick up the potatoes without injuring them as they pass over the plow.

Figures 4, 5:
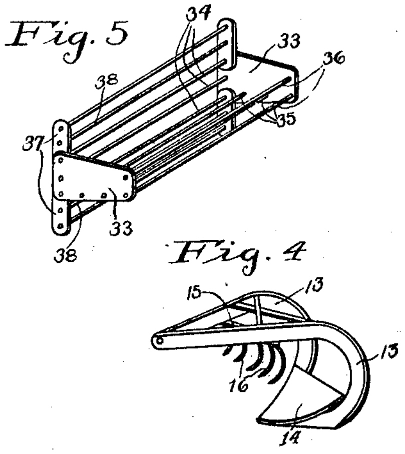
Figure 2:
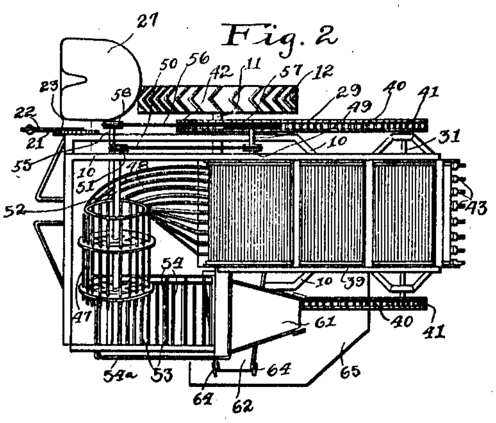
Figure 3:
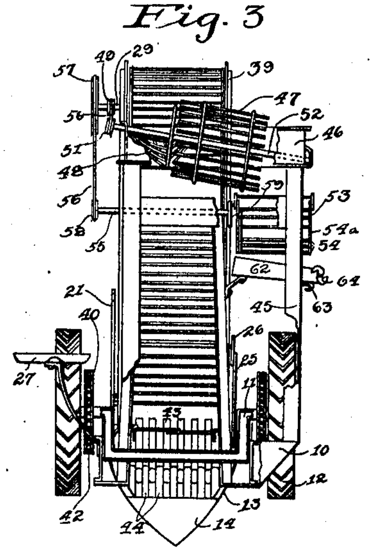
Figure 1:
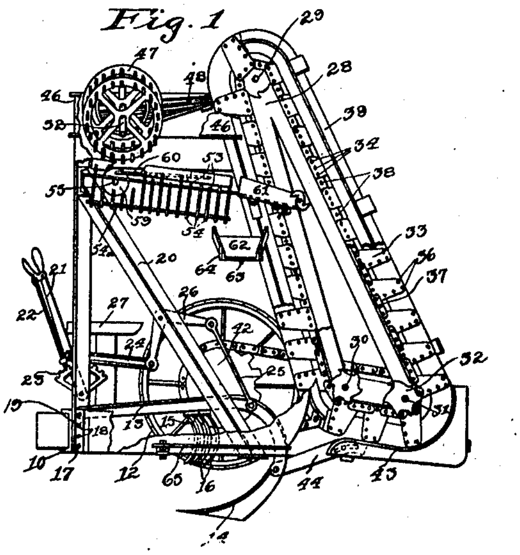

Figure 1 shows a side elevation of my improved harvester; Fig. 2 shows a plan view of the same; Fig. 3 shows a front elevation of the harvester; Fig. 4 shows a detail of the plow and Fig. 5 shows a detail of the basket conveyer.

Referring to the accompanying drawings, the main frame is indicated by the reference numeral 10, and supports the I beam 11 on which the wheels 12 are journaled. The forks of the plow frame 13 diverge to the rear, then converge downwardly to center the plow between the wheels. This construction allows a clear, wide space across the top of the plow 14, with nothing to intercept the free passage of earth and potatoes when dug up, and also supports the plow in a position where undue strain is eliminated when the harvester is turned. The vine or weed rake comprising a frame 15 and a number of parallel rods 16 is hung obliquely on the plow frame 13 ahead of the plow, its purpose being to roll the larger weeds and vines out of the way of the plow 14. Two angle irons 17 fixed vertically on the frame 10 are provided with a series of apertures 18 and are designed to receive a pin 19 to pivotally connect the plow frame 13 with the frame 10. The apertures 18 admit adjustments of the plow frame 13 for either deep or shallow cuts or cuts at any intermediate depth desired. The rear end of the plow frame 13 is slidably mounted between the upwardly extended diagonal stay bars 20, which steady said frame in all its positions. The lever 21 provided with a spring actuated pawl 22 to engage the sector 23 is mounted on the frame 10 and is connected to the plow frame by the links 24 and 25 through the bell crank 26 on the bar 20, said arrangement of parts being designed to raise, lower and secure the plow frame 13 in any position desired. The operator's seat 27 is mounted on the frame 10 in a position near said lever 21. The triangular conveyer frame 28 rounded at its corners is mounted on the main frame 10, and supports the shafts 29, 30 and 31. Ratchet wheels 32 are mounted on the shafts 29, 30 and 31, and support and drive the endless basket conveyer which travels adjacent to the frame 28, and is composed of a series of baskets comprising end pieces 33, rods 34 forming the back, rods 35 forming the bottom, and rods 36 forming the front, and also a series of connecting links comprising side flanges 37 lapping the two adjacent baskets, and rods 38 rigidly attached to and holding said flanges apart. This arrangement is adapted to hold the basket of the conveyer in alinement. The upper and lower rods 34 are spaced equal distances apart and are designed to engage the teeth in the ratchet wheels 32. Guide bars 39 are mounted on the frame 10 and engage the end pieces 33 of the basket conveyer to prevent lateral motion of the same. Sprocket chains 40 connecting the sprocket wheels 42 on the wheels 12, and the sprocket wheels 41 on the shaft 31, drive the basket conveyer, through the ratchet wheels 32 on said shafts.

A stationary grate comprising a series of parallel bars 43 located on the main frame 10 below the conveyer, as shown in Fig. 1, rounds upwardly at the forward end, then slants downwardly following the path of the baskets, then pitches sharply up at the back, still following their curves, and forms a wide receptacle into which the baskets of the conveyer dip. A movable grate comprising a series of bars 44 is pivotally mounted at one end to the plow frame 13 and is slidably mounted at the other between the bars 43 of the stationary grate to form a connection to said grate at any adjustment of the plow 14. The potatoes with adhering earth are scooped into the baskets of the conveyer from said stationary grate, the loose earth falling from the machine through the bars 43 and 44. The apex of the obtuse angle of the triangular frame 28 is arranged at a point above the forward ends of the bars 43, the base of said frame extending rearwardly parallel with the slanting portions of the bars 43.

In the arrangement of parts as above described, the basket conveyer when traveling downwardly and rearwardly around the vertex of the obtuse angle of the frame 28, passes at a comparatively low rate of speed, thus relieving the baskets from any great strain when coming in contact with the earth and potatoes delivered from the plow 14. The conveyer in traveling upwardly around the vertex of the lower acute angle of the frame passes at a comparatively high rate of speed to fill the baskets as they pass from positions adjacent to the bars 43.

Uprights 45 extending from the main frame 10 together with the guide bars 39 support the horizontally arranged beams 46, on which the slightly inclined cylindrical screen 47 is mounted. A chute 48 on the beams 46 leads to said cylindrical screen 47, and is designed to receive from the baskets the potatoes and dirt which still clings to them. The baskets in turning at the top of the conveyer frame 28 empty the potatoes onto the back of the preceding basket whence they roll into the chute 48. This action aids in freeing the clinging earth from the potatoes and a more violent agitation takes place in the cylindrical screen 47 where the potatoes are thoroughly cleaned. The pulley 49 on the shaft 29 is connected by the belt 50 to the pulley 51 on the shaft 52 on which the cylindrical screen is mounted, said arrangement of parts forming a drive for rotating said screen.

Two sorting screens attached to a common frame and slightly inclined to the rear, are slidably mounted on the upper part of the main frame 10. Said screens are located one above the other, the coarse one above, the fine one below, and consist of a number of parallel, adjustable rods 53 and 54 on the frame $54^a$. The shaft 55 on said frame is driven by the belt 56 extending from the pulley 57 on the shaft 29 to the pulley 58 on the shaft 55. The crank wheel on said shaft 55 is connected by the link 60 to the inclined screens and imparts a reciprocating motion to them, said action causing the potatoes to be sorted, the large sizes remaining in the top screen 53, the smaller ones in the bottom screen 54, and the undersized falling to the ground. The spouts 61 and 62 lead from the screens 53 and 54 and carry the potatoes to sacks (not shown) supported by the hooks 63 and 64. The platform 65 shown in Fig. 2 on the frame 10 is designed to provide a convenient place for an attendant to stand while changing sacks on the spouts 61 and 62.

Having described my invention, what I claim as new and desire to protect by Letters Patent is:

1. In a potato harvester, the combination of a main frame, supporting wheels mounted thereon, a plow frame pivotally and adjustably connected to the forward end of the main frame, a plow in said frame, a stationary grate for carrying the potatoes to the rear of the main frame, a movable grate pivotally connected to the plow at one end and slidably mounted on the stationary grate at the other, a conveyer for elevating the potatoes from the stationary grate, means for driving the conveyer, and means for delivering the potatoes from said conveyer.

2. In a potato harvester, the combination of a main frame, supporting wheels journaled thereon, a plow, a bifurcated plow frame the forks of which diverge rearwardly from their point of connection and converge downwardly to the plow, said plow frame being pivotally connected to the main frame, an elevator frame carried by the main frame, an endless conveyer extending upwardly and around said elevator frame, a stationary grate on the main frame immediately below said conveyer, a movable grate pivotally connected at one end to the plow frame and slidably connected at the other to said stationary grate, means for driving the conveyer, and means for delivering potatoes from said conveyer.

3. In a potato harvester, the combination of a main frame, supporting wheels journaled thereon, a plow, a bifurcated plow frame the forks of which diverge rearwardly from their point of connection and converge downwardly to the plow, said plow frame being pivotally connected to the main frame, means for adjusting the rear of the plow frame vertically, an elevator frame carried by the main frame, an endless conveyer extending upwardly and around said elevator frame, a stationary grate on the main frame immediately below said conveyer, a movable grate connected at one end to the plow frame and slidably connected at the other to said stationary grate, means for driving the conveyer and means for delivering potatoes from said conveyer.

4. In a potato harvester, the combination of a main frame, supporting wheels mounted thereon, a plow frame on the main frame, a plow on said plow frame, a weed rake on the plow frame, a stationary grate for carrying the potatoes to the rear of the main frame, a movable grate pivotally connected to the plow frame at one end and slidably mounted on the stationary grate at the other, a conveyer for elevating the potatoes from the stationary grate, means for driving the conveyer and means for delivering the potatoes from said conveyer.

5. In a potato harvester, the combination of a main frame, supporting wheels mounted thereon, a plow frame, a plow on said frame, stay bars for guiding the plow frame, a stationary grate for carrying the potatoes to the rear of the main frame, a movable grate pivotally connected to the plow frame at one end and slidably mounted on the stationary grate at the other, a conveyer for elevating potatoes from said grate, means for driving the conveyer and means for delivering potatoes from said conveyer.

6. In a potato harvester, the combination of a main frame, supporting wheels mounted thereon, a plow frame on the main frame, a plow on said plow frame, a stationary grate on the main frame forming a basket, a movable grate pivotally connected to the plow frame at one end and slidably mounted on the stationary grate at the other, a conveyer for elevating potatoes from said stationary grate, a triangular conveyer frame on the main frame arranged to guide said conveyer over the stationary grate in a path conforming with the lines of said grate, means for driving the conveyer and means for delivering potatoes from said conveyer.

7. In a potato harvester, the combination of a main frame, supporting wheels mounted thereon, a plow frame adjustably mounted on the main frame at one end and supporting a plow on the other, a stationary grate on the main frame, a movable grate pivotally connected to the plow frame at one end and slidably supported from the main frame at the other, a conveyer for elevating potatoes from the stationary grate, means for driving the conveyer and means for delivering potatoes from said conveyer.

8. In a potato harvester, the combination of a main frame, supporting wheels mounted thereon, a plow frame on the main frame, a plow on said frame, a stationary grate on the main frame, a movable grate pivotally carried by the plow frame at one end and slidably mounted on the stationary grate at the other, a conveyer for elevating potatoes from said stationary grate, a triangular conveyer frame on the main frame arranged to guide said conveyer over the stationary grate in a path conforming to the lines of the same, guide bars on said frame for guiding the conveyer, means for driving the conveyer and means for delivering potatoes therefrom.

9. In a potato harvester, the combination of a main frame, supporting wheels journaled thereon, a plow frame adjustably connected at one end to the main frame and supporting a plow at the other, stay bars for guiding said plow frame, a stationary grate on the main frame, a movable grate pivotally connected at one end to the plow frame and slidably connected at the other to said stationary grate, a conveyer for elevating the potatoes from the main frame, a triangular conveyer frame on the main frame arranged to guide said conveyer over the stationary grate in a path conforming with the lines of the same, guide bars on said frame for guiding said conveyer, means for driving the conveyer, and means for delivering the potatoes therefrom.

In testimony whereof, I have signed my name to this specification in the presence of two subscribing witnesses.

OSCAR A. GILMORE.

Witnesses:
K. H. HANSEN,
J. E. STRYKER.

Copies of this patent may be obtained for five cents each, by addressing the "Commissioner of Patents, Washington, D. C."